June 16, 1959  C. H. STARK ET AL  2,890,828
SENSING MECHANISM

Filed April 30, 1954  4 Sheets-Sheet 1

INVENTORS
CHARLES H. STARK
GUY F. STARK

BY Sol Shapiro

ATTORNEY

June 16, 1959 C. H. STARK ET AL 2,890,828
SENSING MECHANISM
Filed April 30, 1954 4 Sheets-Sheet 2

INVENTORS
CHARLES H. STARK
GUY F. STARK

BY Sol Shappirio
ATTORNEY

INVENTORS
CHARLES H. STARK
GUY F. STARK

BY Sol Shappirio

ATTORNEY

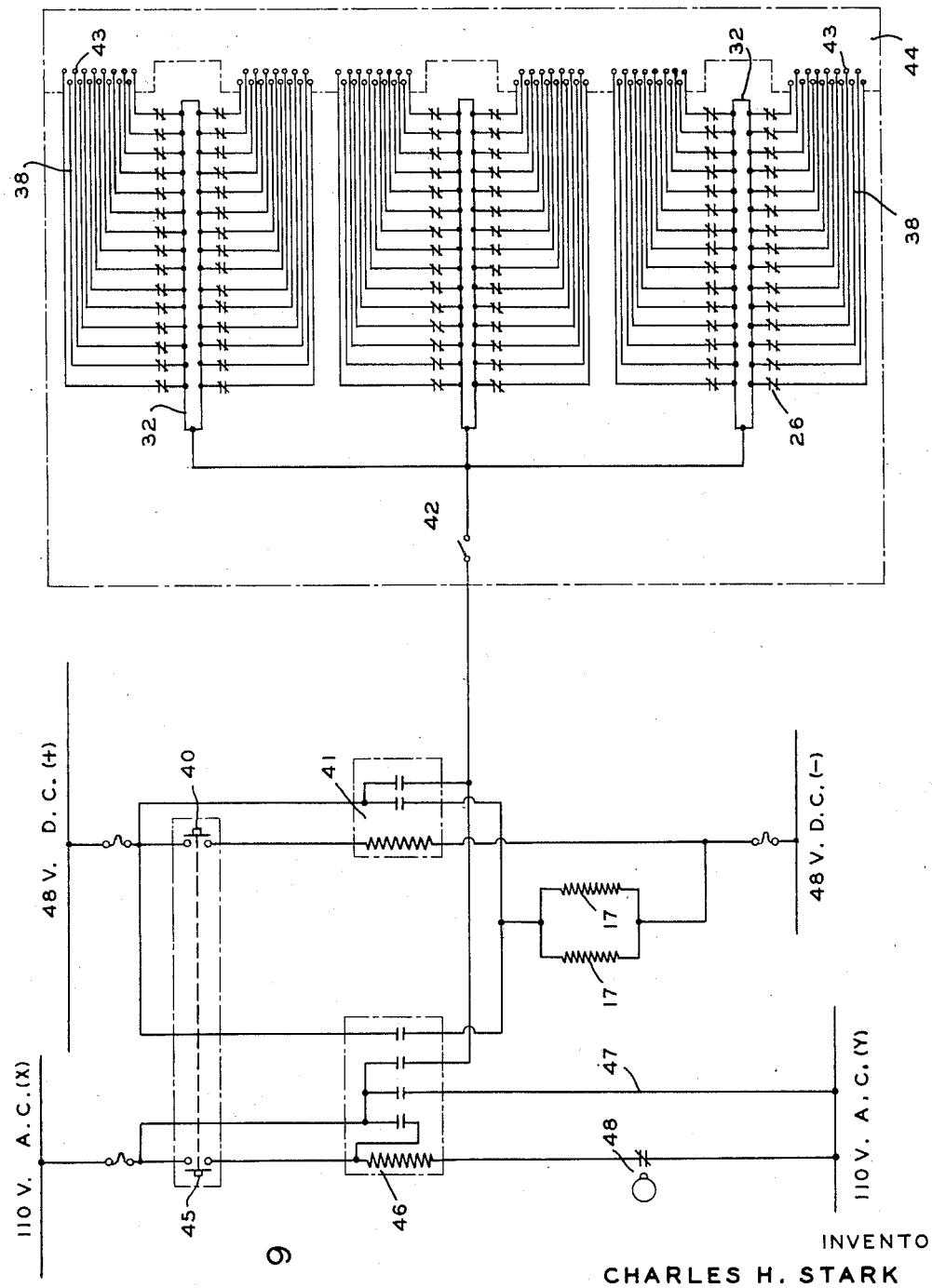

United States Patent Office 2,890,828
Patented June 16, 1959

2,890,828

SENSING MECHANISM

Charles H. Stark, Baltimore, and Guy F. Stark, Gibson Island, Md., assignors to Automatic Remote Systems, Inc., a corporation of Maryland Application April 30, 1954, Serial No. 426,896

5 Claims. (Cl. 235—61.11)

This invention relates to sensing mechanism and methods of relatively simple but effective character of use in sensing operations connected with automatic systems as for example card recording systems, apparatus, equipment and methods, remote control accounting systems, apparatus, equipment and methods, and any other methods or apparatus in which data recorded on a card or analogous element whether by perforation or otherwise is transmitted to some point for totalizing, recording, collecting or for any other purpose.

A great variety of automatic systems and apparatus have been devised in the prior art for transmitting data from one or a multiplicity of points to a station or stations remote from the point where the data is available as on punched cards or other records. In such systems, apparatus in the nature of sensing devices are used to respond to the recorded data and to transmit the data or information in connection with it to one or more distant points.

Many sensing devices have been proposed for these purposes but for the most part they are relatively complex, expensive to build, subject to inaccuracy and unreliability, and liable to other uncertainties in operation that militate against their utility.

Among the objects of the present invention are included sensing apparatus of certainty of accurate action yet relatively simple and inexpensive while exhibiting continuous, accurate, and positive control.

Other objects include such sensing apparatus and methods having novel features in operation.

Still further objects of this invention will appear from the more detailed description set forth below, it being understood that such more detailed description is given by way of illustration and explanation only, and not by way of limitation since various changes therein may be made by those skilled in the art without departing from the scope and spirit of the present invention.

In connection with that more detailed description the drawings show the following:

Figure 7 is a plan view of an illustrative card that may be used from which information or data is to be obtained during the sensing operation.

Figure 9 is an illustrative wiring diagram.

Figure 1:
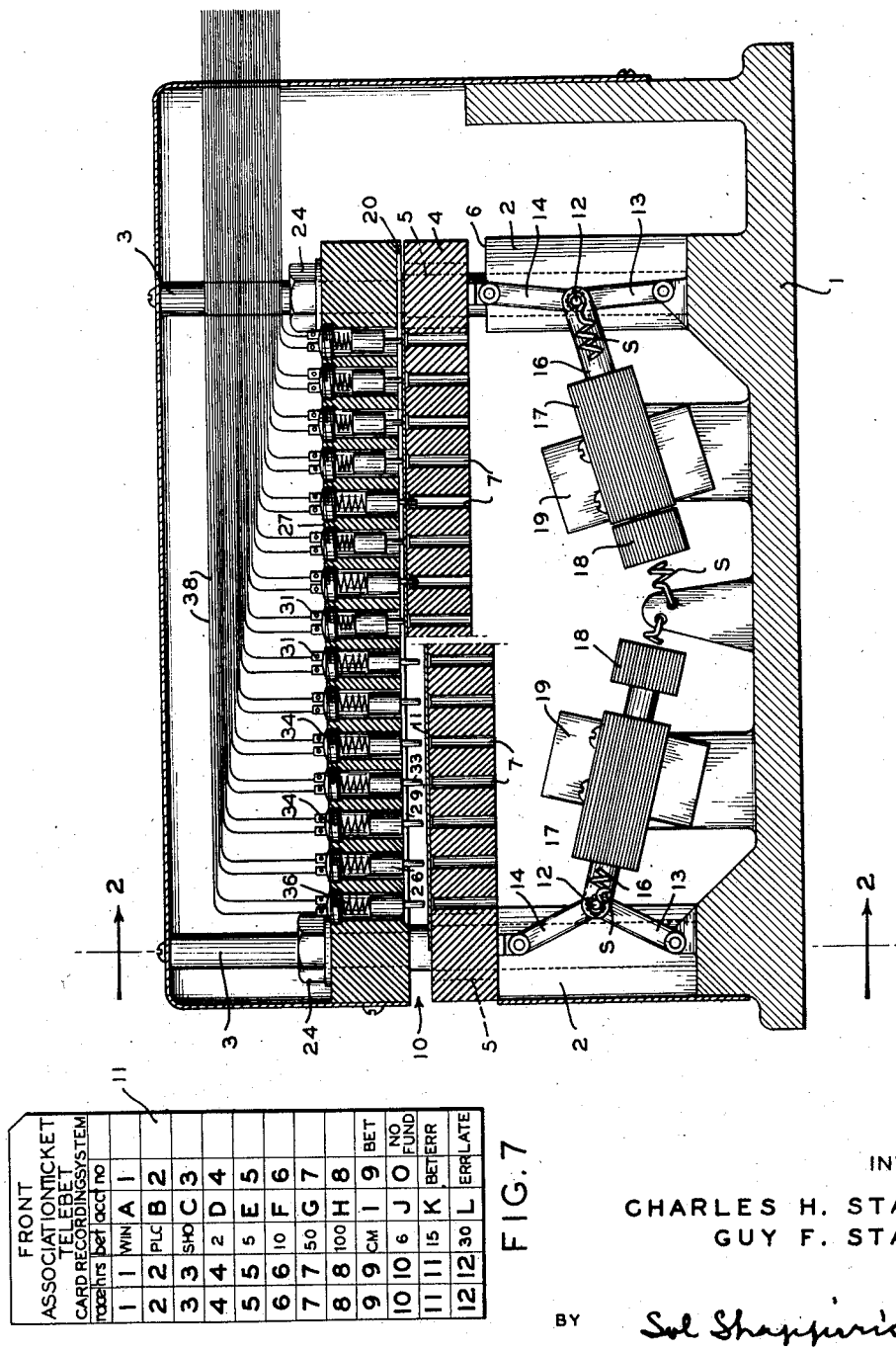
Figure 1 is a side elevation partly in section of sensing mechanism in accordance with the present invention.

The present invention relates to sensing apparatus and methods wherein a card or analogous element carrying data to be sensed is inserted into a sensing zone of sensing mechanism, is desirably moved therein into sensing position, the sensing operation is carried out and the card is removed. The invention will be illustrated by use of a card which carries the data or information to be sensed in the form of perforations in the card in position thereon to indicate predetermined data or information. But it will be understood that cards or analogous elements carrying data or information thereon in any other manner as by any type of physical alteration may be utilized. Further the invention will be illustrated by systems where the card to be sensed is manually inserted into the sensing zone; but any other means or method for such insertion may be employed including automatic operation, by conventional and known means.

In the sensing zone, certain sensing or scanning operations are carried out requiring apparatus and methods to be activated in order to perform such sensing operations. The systems of the present invention will be illustrated by the use of electrically activated apparatus but any other system including mechanical operations may be employed except where incompatible with the particular operation or apparatus described.

The energy for operating such apparatus or methods may be brought into action by separately operated activating elements or switches in electrical circuits, that may be manually operated. But more desirably it is a feature of the present invention to cause such activation, such as closure of an electrical circuit, by the act of inserting a card into the sensing zone whereby movement of the card may close or open a switch depending on the system used, to close or open a circuit to cause the desired action to take place. Such card controlled activation may be used in the circuit for moving the card in the sensing zone into sensing position therein or for sensing operations after the card is in sensing position, or for both purposes or for any other desired operation. In such cases the removal of the card will then have the reverse effect of opening or closing the switch or other activating element depending on the system in use; or the opening or closing of the circuits after the sensing operation may be controlled by means other than removal of the card.

In sensing operations of the character necessary for present purposes, a large number of circuits is required with consequent wiring to provide the necessary circuits. Structures for these purposes are greatly simplified by the present invention by providing a switch plate with a multiplicity of openings and a switch and sensing element in each opening. A unitary structure is thus produced in which any number of switches and sensing elements are provided in such unified structure. Desirably each switch carries a sensing element to constitute a unitary switch and sensing element such unitary element being placed in each opening of the switchplate. Therefore a large number of switches and sensing elements may be combined into a single unit which may be assembled or disassembled in a simple operation.

In such structures as an exceedingly simple switch and sensing element may be provided as a unit by constructing the switch in a block of insulating material provided with an opening in which a plunger may reciprocate. The walls of the opening may be provided with separated metal or other contacts. The reciprocating plunger will then connect said contacts in one position of the plunger and disconnect or break the circuit through said contacts in another position of the plunger. By forming the sensing element as a projection on the plunger, pressure against the projection may be used to fix the position of the plunger in the opening and thus determine whether the circuit through the contacts is open or closed.

The pressure against the projection on the plunger is desirably controlled by the card to be sensed. Thus where a perforated card is utilized as the source of data or information, a perforation in the card will permit the projection on the plunger to pass through the perforation thus determining the position of the plunger in the opening of the switchplate, and determining whether the circuit through the contact in that particular opening is closed or open. The plunger and contacts may be arranged so that the circuit is closed when the projection passes through the perforation so that the plunger then completes a circuit through the contacts, or the contacts may be so positioned in the wall of the opening that passage of the projection into a perforation permits the plunger to move out of contact thereby opening the circuit.

To simplify further the arrangement of a multiplicity of switches in this way, the switch plate is desirably provided with a multiplicity of openings arranged in rows. Each opening is provided with one individual electrical contact, while the other contact may be provided by a bus bar or metal strip running under a row of openings and projecting a short distance into the opening in one position to contact the bus bar. Where the openings are arranged in parallel rows, one bus bar may serve as a contact for each of the openings in two adjacent rows. In this way the number of connecting wires required to the sensing zone may be practically reduced to one-half. Thus for example where ninety switches are provided in a block arranged in six rows of fifteen each, a bus bar may serve as one connector in two adjacent rows thus enabling one connecting wire to a bus bar to be used in lieu of thirty connecting wires to the switches in that pair of adjacent rows. In this way three wires will serve in lieu of ninety wires to provide one circuit connection for each of the ninety switches. Any other arrangement of switches and connections may of course be used.

Simplified foolproof switches of the type described above insure certainty of operation with minimum possibility of breakdown. Further such switches enable other functions to be obtained. While as described above a single pair of contacts may be provided so that one circuit only is controlled by operation of a single switch, the walls of one or more of the openings may be provided with a pair of secondary contacts which in an intermediate position of the plunger will be bridged and a secondary circuit for a light or other signal for example may be operated.

The sensing mechanism used in accordance with the present invention includes a switchplate of the character set forth above and a card platen to support the card or other element to be sensed, the plate and platen desirably being arranged in superposed relation and reciprocable toward each other to what is here called closed position in which position sensing is carried out, and away from each other to what is here called open or relaxed position in which position the card may be inserted for sensing or to be removed after sensing. The open or relaxed position separates the switch plate and card platen sufficiently so that the card clears any sensing fingers or projections from perforations in the card so that the latter may be removed. Desirably the plate or the platen is fixed and the other is reciprocated to and away from the fixed element. Since the switch plate carries the multiplicity of switches and requires numerous connectors and conductors to be connected thereto, it is more desirable to utilize the switch plate as the fixed element. Further by using the switch plate as the upper element all connectors can be carried overhead. Thus no electrical connections or moving elements are required in the reciprocable card platen.

The reciprocation of the card platen is timed to take place immediately after insertion of a card to be sensed into position on the platen. For this purpose the platen may be mounted on toggle joints adapted in one position to elevate the platen toward the switch plate and in the opposite position to return the platen to relaxed position. A simple mechanism for this purpose may make use of an electromagnet which when energized moves an armature to operate the toggle joint while a spring may be used to return the armature and thereby the toggle joint to relaxed position upon deenergization of the magnet. A separate switch may be manually operated to close the circuit to the magnets or the insertion of the card into position between the switch plate and card platen may during the movement of insertion operate the switch to control the circuit to the magnet. The circuit may be broken manually after the termination of the sensing operation to restore the parts to relaxed position for removal of the card. Insertion and removal of a card may be facilitated by use of a sliding frame, the closed position of plate and platen providing a passage for that purpose.

The sensing circuits may be kept closed continuously or may be closed only during the period that a card is in position to be sensed. Separate manually operated switches may be used to close and open circuits for this purpose or the insertion of a card into the sensing zone may be used to close a switch to energize the sensing circuits. In the latter event, removal of the card will break the circuits. Where the sensing circuits are kept closed continuously even when the plate and platen are in relaxed position, no current need flow until a card is placed in sensing position this result being obtained either by separate switch control or by switch closure operated by card insertion.

Figure 2:
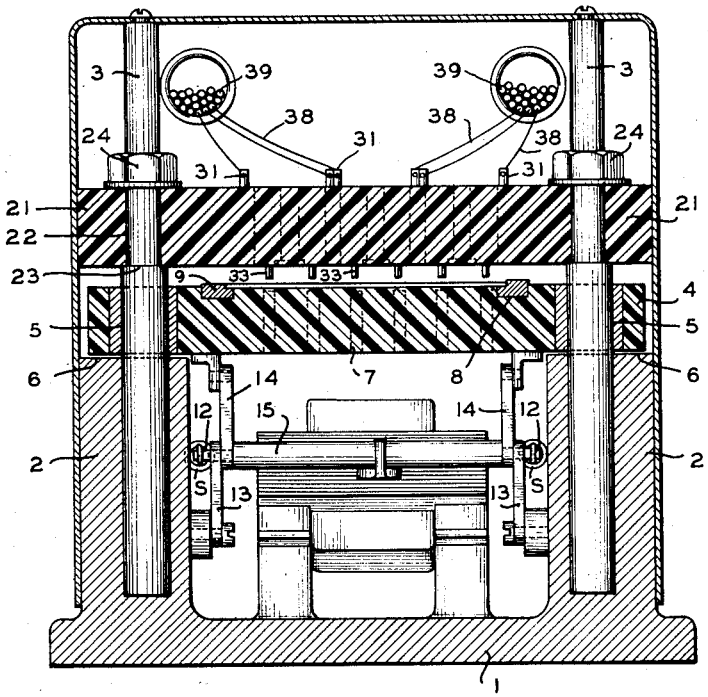
Figure 2 is a section on the line II—II of Figure 1.
Figure 8:
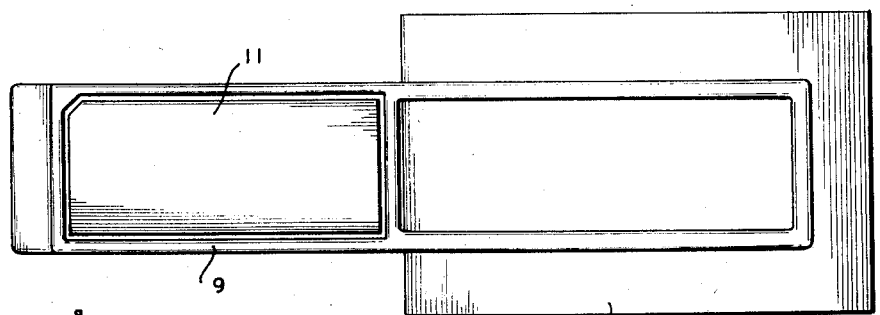
Figure 8 is a top plan view of a card holding frame for insertion of a card into the mechanism.

Turning to the particular form of mechanism shown in the drawings and referring particularly to Figures 1 and 2, base 1 carries uprights 2 in which standards 3 are mounted. Card platen 4 has openings 5 to enable it to be placed on standards 3 on which it rests on shoulders 6 in relaxed position of the platen. The openings 5 are of a size just sufficient to permit platen 4 to reciprocate vertically on standards 3. Platen 4 is provided with a multiplicity of openings 7 into which sensing elements hereinafter described, may penetrate, the number and arrangement of openings 7 corresponding with the number and arrangement of sensing elements. Platen 4 is provided with a pair of tracks 8 in which card holding frame 9 may move for insertion of card 11 into sensing zone 10 and for removal therefrom.

For reciprocation of card platen 4, toggle joints 12 having toggle elements 13, 14 are provided, element 13 being attached at one end to upright 2 and element 14 being attached at one end to platen 4. As shown, four toggle joints may be used operated in pairs. Each pair of toggle joints 12 is controlled by a cross bar 15 connected to armature 16 positioned within solenoid 17 which upon being energized attracts magnet 18 carried on armature 16, the solenoid being attached to upright 19 on base 1. Operation of the toggle joint moves platen 4 upwardly for purposes hereinafter set forth, into closed or sensing position 20. For return of the card platen to open or relaxed position upon deenergization of the solenoid spring "S" is desirably used, the separation of switch plate and card platen being sufficient for the card to clear any sensing fingers or projections on the sensing elements as hereinafter described. The card platen may be made of any desired material since it need carry no electrical circuits or connectors or conductors, but desirably may be made of plastic such as "Bakelite" which may be molded in a simple operation to provide a platen with card frame tracks 8 and openings 5 and 7.

Figure 3:
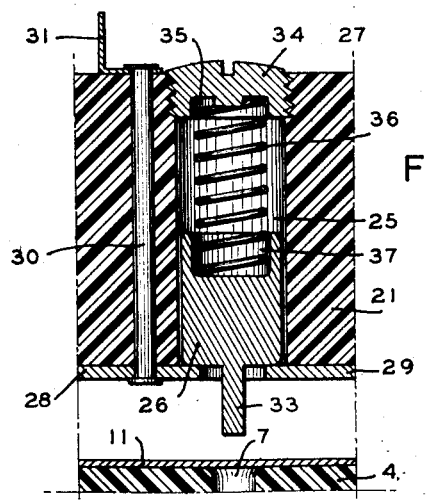
Figure 3 is a section through a switch used in circuit control of the mechanism of Figure 1.

Switch plate 21 of insulating material such as "Bakelite" is provided with openings 22 to enable it to be positioned on shoulders 23 on standards 3. Nuts 24 serve to hold switch plate 21 in fixed position toward which card platen 4 reciprocates. The switch plate is provided with a multiplicity of openings 25 in each of which a sensing element is placed together with a switch controlling the circuit to its coacting sensing element. The sensing element and switch desirably constituting a unit. Thus plunger 26 of metal such as brass or other conducting material is placed in opening 25 (see Figure 3) and is adapted to move therein to close a circuit in one position and open the circuit in another position. For this purpose the wall 27 of opening 25 carries a pair of separated metal contacts, 28, 29. Contact 28 is an individual switch electrical contact to which electrical connection is made through rivet 30 to connection lug 31. Contact 29 is desirably provided by way of a bus bar 32 constituting a common connector for contacts 29 of a row of openings 29 (see Figures 5 and 6).

Figure 4:
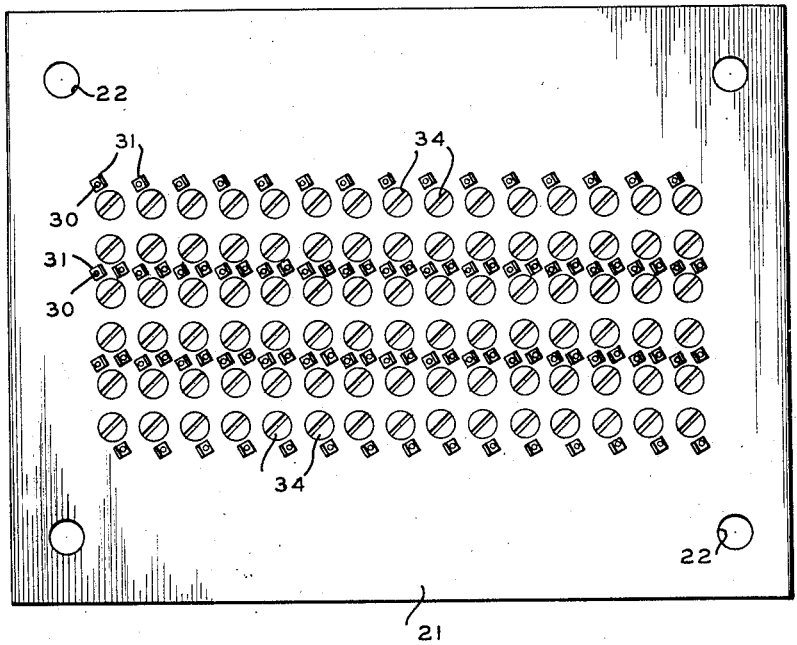
Figure 4 is a top plan view of the switch plate.
Figure 5:
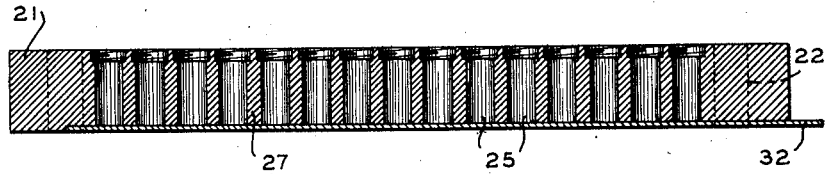
Figure 5 is a transverse section of the switch plate.
Figure 6:
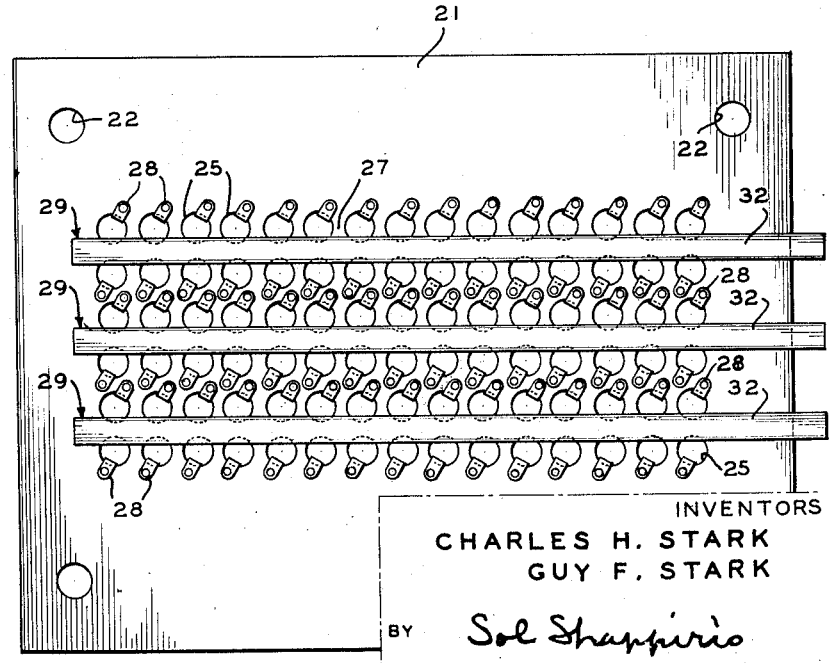
Figure 6 is a bottom plan view of the switch plate.

As shown in the Figures 4, 5, and 6, openings 25 are desirably arranged in a fixed pattern, illustrated here as six rows of fifteen openings 25 to provide ninety openings for ninety switches and sensing elements. When so arranged a single bus bar 32 (see Figure 6) may not only serve as contact 29 in each opening 25 of one of the rows but may serve the same function for an adjacent pair of openings. Consequently, three bus bars 32 as shown in Figure 6 will serve to provide a contact 29 for each of ninety openings, thus eliminating the necessity for ninety overhead conductors to contacts 29. Each contact 28 extends into each opening 25, and bus bar 32 extends across each opening 25 so that each plunger will connect its corresponding contacts 28 and 29 when in lowermost postion. The contacts may if desired be placed in an upper position of opening 25 so as to be connected in an elevated position of plunger 25 and disconnected in a lower position of the plunger. The structure shown makes it simple to provide a sensing element as a projection 33 on the bottom face of plunger 26. Desirably each opening 25 is tapped at its upper end and a threaded cap 34 provided as a closure, the cap having a seat 35 for one end of coil spring 36 which at its other end engages plunger 26 in seat 37 to urge the plunger normally into lowermost position bridging contacts 28 and 29 with sensing element 33 extending outwardly from opening 25.

A conductor 38 is connected to each connection lug 31, and suspended in rings 39 to serve as one conductor in the sensing circuit for sensing element 33, the other connection being made to bus bar 32. Each sensing element thus has its individual circuit which is carried from the sensing device to any desired station where receiving equipment of any desired type is placed as indicated below. The sensing device and method of the present invention may be utilized with any type of totalizing or other equipment and such equipment does not constitute part of the present invention.

The utilization of the device will be obvious from the description set forth above but the following is noted. Card 11 to be sensed is placed in card holding frame 9 and inserted into sensing zone 10, the plate and platen being in open or relaxed position. As illustrated in the relaxed position, all switches are in lowermost position (Figure 1) so that all circuits are closed but the circuits are not energized. After the card has been inserted, the toggle operating circuit is energized so that card platen 4 is moved upwardly to closed position carrying card 11 with it. On such movement, wherever card 11 has an opening beneath a sensing element 33, the latter passes through the opening permitting plunger 26 to close the circuit through its coacting contacts 28, 29. Wherever no opening is present for this purpose, the card pushes against sensing element 33 to elevate plunger 26 and open the circuit controlled by that switch. Consequently sensing circuits are opened or closed depending upon the pattern of openings in a particular card, and the circuits operated to transmit that information to one or more stations for receiving it for totalizing or other purposes. For example, the sensing mechanism of the present invention may be used in systems such as that shown in Patent No. 2,107,008 or in Patent No. 1,998,527.

While any desired wiring arrangement may be used, an illustrative wiring diagram is illustrated in Figure 9. As there indicated, in common with practice in many systems, two differently powered circuits may be utilized, one being for example, a 48 volt D.C. circuit conveniently employed for operation in the sensing circuit and the other being a 110 volt A.C. circuit for operation of bookkeeping machines and related equipment. Referring particularly to the 48 volt circuit illustrated in Figure 9, when bush button switch 40 is closed, the sensing operation is carried out for utilization on totalizing equipment (not shown) the operation of switch 40 closing the circuit through 48 volt D.C. relay 41 and operating solenoids 17 which elevate platen 4. Movement of platen 4 operates switch 42 desirably carried on the sensing mechanism to close the circuits to common contact bus bars 32. Switches 26 controlled by the openings in the card being sensed, open or close the circuits through conductors 38 leading to terminals 43 to which the connections are made to complete the circuits through terminal board 44 to the equipment to be operated. The terminal board is desirably not built into the sensor housing but is a separate part in the immediate vicinity of the sensor proper.

When sensing is being carried out for bookkeeping operations, closure of switch 45 energizes the circuit through 110 volt A.C. auxiliary relay 46 to the bookkeeping business machine circuit 47 and cam operated switch 48 on the business machine, switch 42 on card platen 4 being closed as explained above to energize the circuits controlled through the sensing mechanism.

Having thus set forth our invention, we claim:

1. A contact sensing mechanism suitable for actuation by sensing plungers of perforations in a card, comprising a standard for mounting a switch plate and a card platen, a switch plate fixedly mounted on said standard, a card platen reciprocally mounted on said standard and actuatable by toggle joint means to reciprocate towards said switch plate in closed position and away from said switch plate in open position, said switch plate and card platen being spaced apart in closed position to form a channel for reception of a card to be sensed, said switch plate being formed of electrical insulating material and having a number of openings arranged in rows therein, each opening of said switch plate being fitted with a unit switch comprising a plunger of electrically conductive material movable therein, a pair of separated metal contacts for each unit switch adapted to be electrically connected by the plunger in one position of said plunger and to be electrically disconnected from the plunger in another position thereof, a conducting metal strip connector positioned under a row of said openings joining one only of the contacts of each opening said strip projecting into the openings to form a common contact for a row of said unit switches, and a projection on each of the plungers for contacting the card to be sensed, each projection functioning as a sensing element controlled by pressure of said card against the projections to control the electrical connecting portion of each plunger with respect to its contact, some projections electrically connecting some of the unit switches in certain circuits through the switch plate openings while other plungers are positioned by their projections in electrically disconnecting position in other unit switches.

2. A contact sensing mechanism as set forth in claim 1 wherein each plunger is fitted with a spring positioned in said opening to urge said plunger into electrically connecting position across said contacts while pressure against a projection in opposition to said spring urges said plunger into a disconnect position.

3. A contact sensing mechanism as claimed in claim 2 in which each opening is provided at one end with a removable closure against which the spring seats, while the other end of the spring seats against the plunger.

4. A contact sensing mechanism as set forth in claim 1 provided with an armature and electromagnetic solenoid for actuating said armature to move said card platen by actuating said toggle joint means away from said switch plate into open position.

5. A contact sensing mechanism as set forth in claim 4 provided with spring means acting on said toggle joint means to restore said card platen to closed position toward said switch plate after insertion of said card into said channel actuates said electromagnetic solenoid to move said platen away from said switch plate into open position.

References Cited in the file of this patent

UNITED STATES PATENTS

| | | |
|---|---|---|
| 1,688,308 | Harding | Oct. 16, 1928 |
| 1,825,141 | Brand | Sept. 29, 1931 |
| 2,107,008 | Lasker | Feb. 1, 1938 |
| 2,161,598 | Torkelson | June 6, 1939 |
| 2,231,186 | Sould | Feb. 11, 1941 |
| 2,636,676 | Paige | Apr. 28, 1953 |
| 2,651,461 | Luhn | Sept. 8, 1953 |